United States Patent [19]
Terry

[11] Patent Number: 5,711,980
[45] Date of Patent: Jan. 27, 1998

[54] PROCESSING AND PACKAGING METHOD FOR COMBINED PRODUCE TYPES

[75] Inventor: Mark Terry, Fresno, Calif.

[73] Assignee: Cal-State Material Handling Systems, Inc., Fresno, Calif.

[21] Appl. No.: 637,039

[22] Filed: Apr. 24, 1996

[51] Int. Cl.⁶ .................. B65B 55/00; A23B 7/00
[52] U.S. Cl. .................. 426/392; 47/1.01; 62/78; 134/10; 210/805; 426/419
[58] Field of Search .................. 426/106, 321, 426/324, 326, 327, 335, 418, 419, 615; 210/167, 705, 805; 209/509, 606, 629, 659, 667, 673; 134/10, 111; 422/40, 41; 198/340, 398, 617; 47/1 R, 58 L, 58 EM, 58 EC, 58 T

[56] References Cited

U.S. PATENT DOCUMENTS

| | | | |
|---|---|---|---|
| 465,856 | 12/1891 | Hutchins | 209/629 |
| 1,507,328 | 9/1924 | Babigian et al. | 426/321 |
| 1,696,704 | 12/1928 | Zellner | 210/167 |
| 2,335,164 | 11/1943 | Wayland et al. | 209/667 |
| 2,440,911 | 5/1948 | Pancoast | 426/335 |
| 2,522,535 | 9/1950 | Pryor | 426/335 |
| 4,015,366 | 4/1977 | Hall | 47/1.01 |
| 4,894,997 | 1/1990 | Urushizaki et al. | 426/419 |
| 4,943,440 | 7/1990 | Armstrong | 426/392 |

Primary Examiner—Joseph W. Drodge
Attorney, Agent, or Firm—Fenwick & West LLP

[57] ABSTRACT

A method for extending the shelf life of harvested produce against decay and premature ripening includes initial cooling of the produce, and thereafter maintaining the produce at the reduced temperature and at high humidity during processing and storage and packaging to final shipment for consumption. Cooled water with preservative chemicals rinse the produce at initial processing to suppress the ripening process significantly. Subsequent temporary storage between processes and processing steps occur substantially at the reduced temperature and high humidity to maintain the produce in a state of reduced ripening activity. The harvested produce is cut up and sized for volume collection and temporary storage as infeed to combining and packaging processes as required. Prescribed amounts of selected produce are individually packaged and crated for shipment in cooled and humid cargo carriers to remote locations where shelf life against decay and premature ripening is significantly extended.

7 Claims, 6 Drawing Sheets

PROCESSING AND PACKAGING METHOD FOR COMBINED PRODUCE TYPES

FIELD OF THE INVENTION

This invention relates to equipment and processes for packaging fresh produce for extended shelf life, and more particularly to such equipment and processing which can be rapidly reconfigured and operated according to the requirements of the type of produce to be processed.

BACKGROUND OF THE INVENTION

Certain known methods of preparing farm-grown produce for transportation and marketing in approximately natural condition commonly include boxing or otherwise packaging the produce in the field from where harvested for shipment by refrigerated trucks to a transit terminal where the produce may be graded, sized and forwarded for wholesale distribution. Other known methods include gathering large volumes of common produce such as tomatoes, certain peppers, potatoes, and the like, into truck-mounted bins for transportation to produce terminals where minimum grading occurs prior to forwarding for mass crushing, peeling, and the like, of the entire bin of produce.

Such mass-volume methods for processing farm-grown produce typically expose the produce to diverse surrounding conditions of cold, heat, sun, wind, and rinse water that individually stimulate the produce to ripen more rapidly and more slowly, frequently beyond acceptable marketable condition. Thus, rapid processing, cold storage temperatures, swift transport mechanisms and procedures all contribute to prolonging the useful marketable life of produce made available in appealing condition to the ultimate consumer. However, it has been determined that subjecting certain produce the varying conditions of heat, cold, agitation, rinsing, and the like, in alternating combinations, or during insufficiently long intervals during successive processing conditions, can be detrimental rather than beneficial to the extension of useful marketable life of such produce.

SUMMARY OF THE INVENTION

Accordingly, the present invention incorporates substantially uniform environmental conditions in all processing of produce to obviate diverse stimulations of the ripening process in the produce being processed. Once chilled, the produce continues to be processed at correspondingly low temperatures throughout the sequences in the preparations for marketing, with significant improvements in useful marketable lifetimes, and with concomitant reductions in excessively ripened produce.

DETAILED DESCRIPTION OF THE INVENTION

Figure 1:
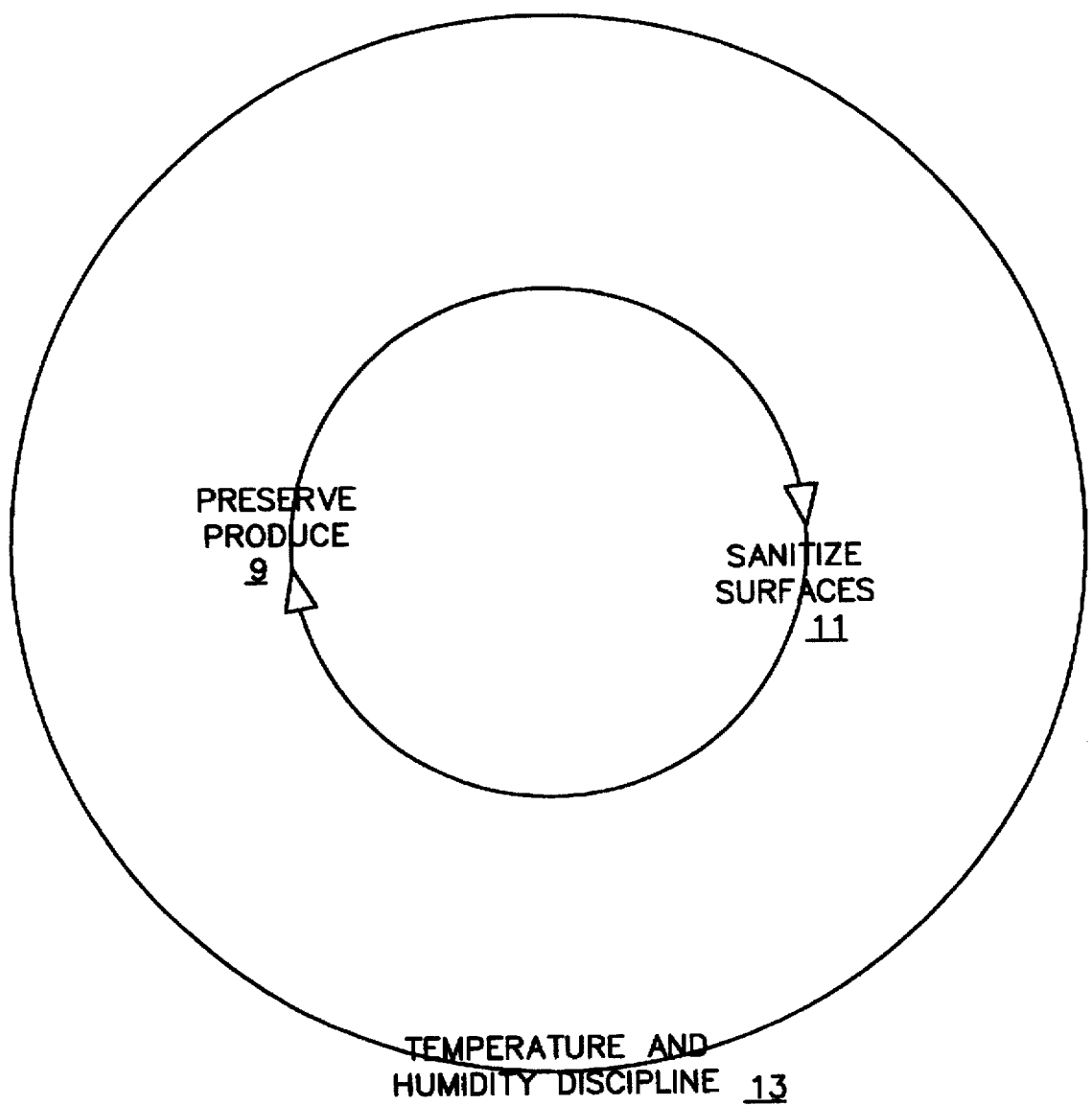
FIG. 1 is a pictorial diagram illustrating the overall operation of the present invention for improved shelf life of fresh produce.

Referring now to the pictorial diagram of FIG. 1, there is shown the overview of produce processing 9 in sanitary conditions 11 within a cooled environment 13 to assure extended shelf life and display for selection and consumption by customers and end-users.

Figure 2:
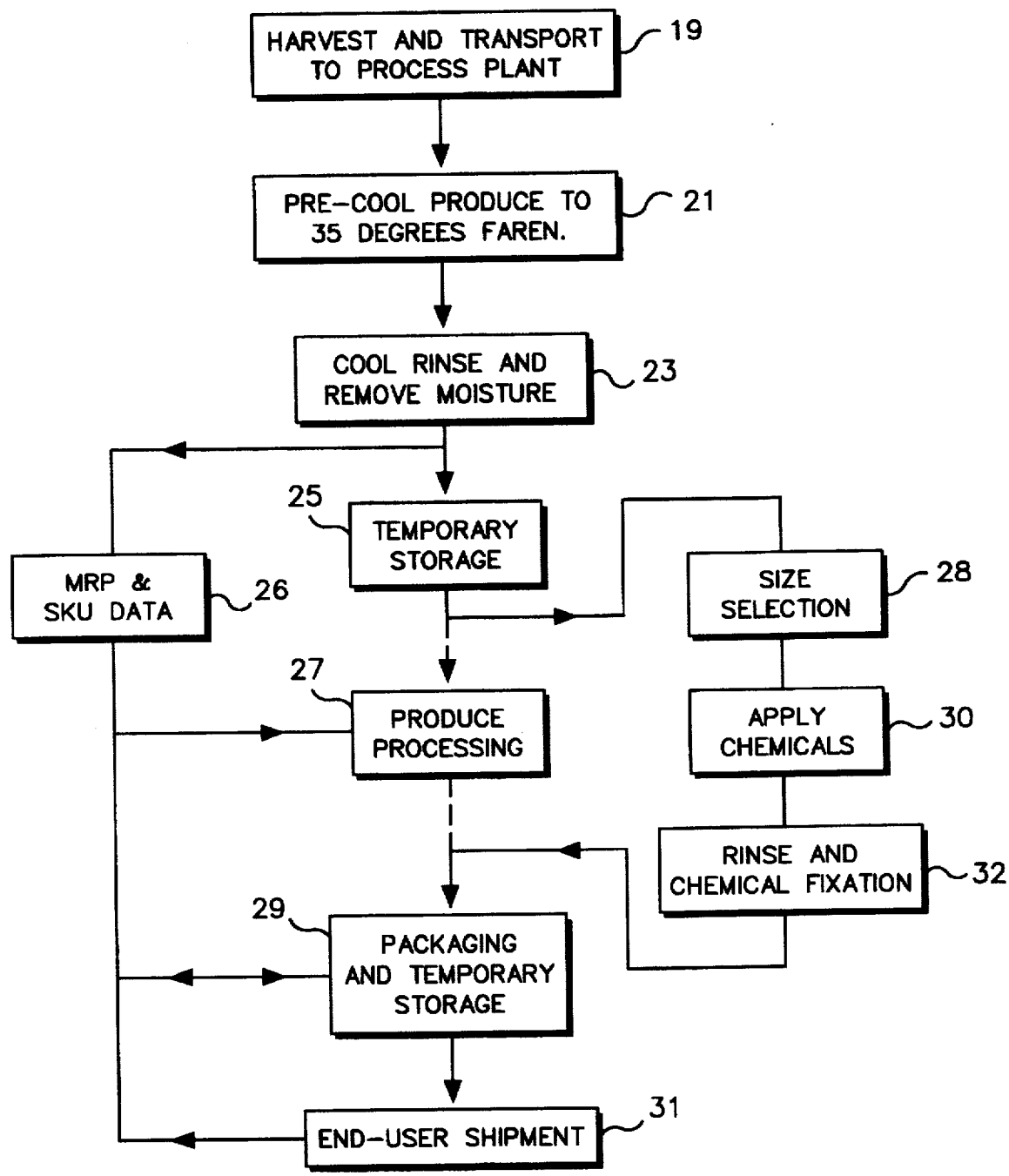
FIG. 2 is a flow chart illustrating the sequence of processing steps according to the present invention.

Specifically, as illustrated in FIG. 2, produce is harvested 19 and provisionally inspected in the field and is transported by the farmer in field bins. These field bins are off-loaded from field trucks, for example, with the aid of fork-lifts, and placed onto conveyors, as the system infeed for transport to a flushing container such as a conventional HydroVac. The HydroVac receives the field bins of produce in sequence for flushing with water that is chilled and filtered to remove particulates and bacteria (primarily e. coli). This flushing 21 of the produce at a predetermined temperature (e.g. approximately 35° F. for broccoli, cauliflower, and the like) cleans the produce and gently lowers its overall temperature. The produce then completes the flushing cycle and is drained, and residual moisture is then vacuumed from the produce 23. In effect, the produce is thus initially chilled to retard the ripening process, or essentially is put to 'sleep'. The "dirty" water drained and vacuumed from the produce is cycled back into the filtration system for cooling and reuse on subsequent batches of produce to complete the loop of recycled water, as illustrated and described later herein with reference to FIG. 4.

The produce thus discharged from such flushing operations is directed into the cooled facility where further processing of the produce occurs at the reduced temperature (e.g., 35° F. and greater than 90% humidity throughout for broccoli, cauliflower, salad produce, and the like). Bins of produce are weighed and coded into the system via a bar code "tracking" label attached to each such bin. Each bin bar code is "scanned" for entry of the data into the inventory system 26 (e.g., manufacturing and resource planning system, or MRP). The bins are transported, for example, via lift truck or conveyors into the cooled storage system 25 which separates produce by produce Stock Keeping Units (SKU), and First-In-First-Out (FIFO) storage and retrieval demands. The FIFO storage system automatically indexes each bin toward a storage space in front for next-available selection and subsequent processing.

Figure 5:
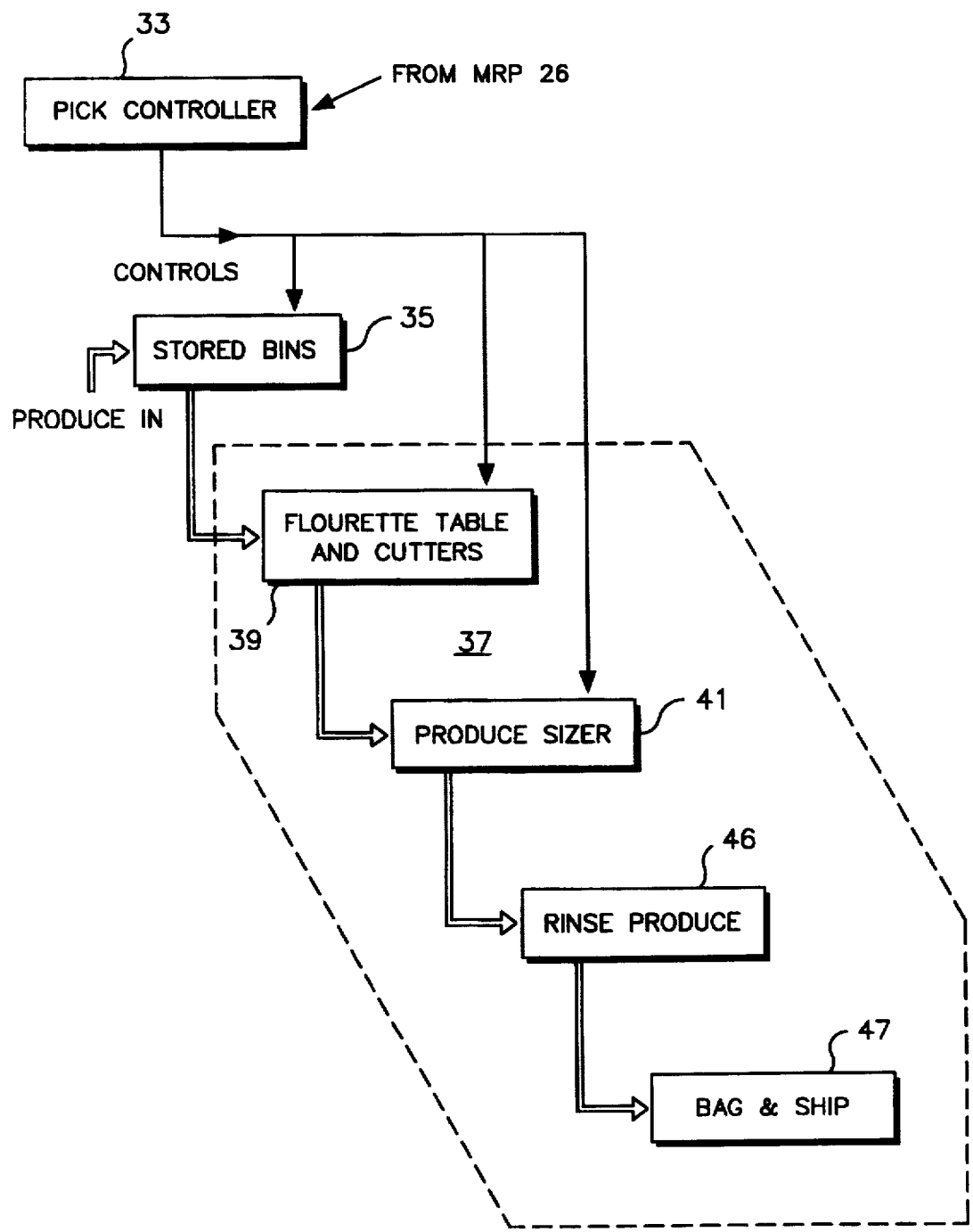
FIG. 5 is a flow chart illustrating produce flow and control system for selecting and processing various combinations of different produce.

The requirements and details for production of an end product from the available produce are compiled in a pick list that is generated by the MRP system 26. The pick list in electronic controller 33 identifies the bin(s) of produce in FIFO storage 35 to be selected and transported via conveyor or fork-lift truck to the production system 37 including cutting tables 39, sizers 41, and the like, as illustrated in FIG. 5. The selected bin is "scanned" to signal the production system 37 which bin and associated produce contents is entering the processing system. The bin is deposited into a tank hopper at the front of a production "line". Each such line is set up with the flexibility to either run a specific product or a combination of products at various predetermined speeds, dependent upon product requirements (e.g., 12 feet per minute for broccoli slaw, or 38 feet per minute for spring salad, or 3 feet per minute for broccoli flourettes, or the like). An "infeed operator" (i.e., operator at the head of a line) scans the field bins to signal the MRP system 26 about the specific bin of field produce now starting to be processed by the line. This head line operator may view a displayed picture on the pick controller 33 of the end product to be produced, and press a button below the selected end product to activate a computer which sets up the line or lines of infeed produce, and the requisite line speeds associated with the selected end product.

Figure 4:
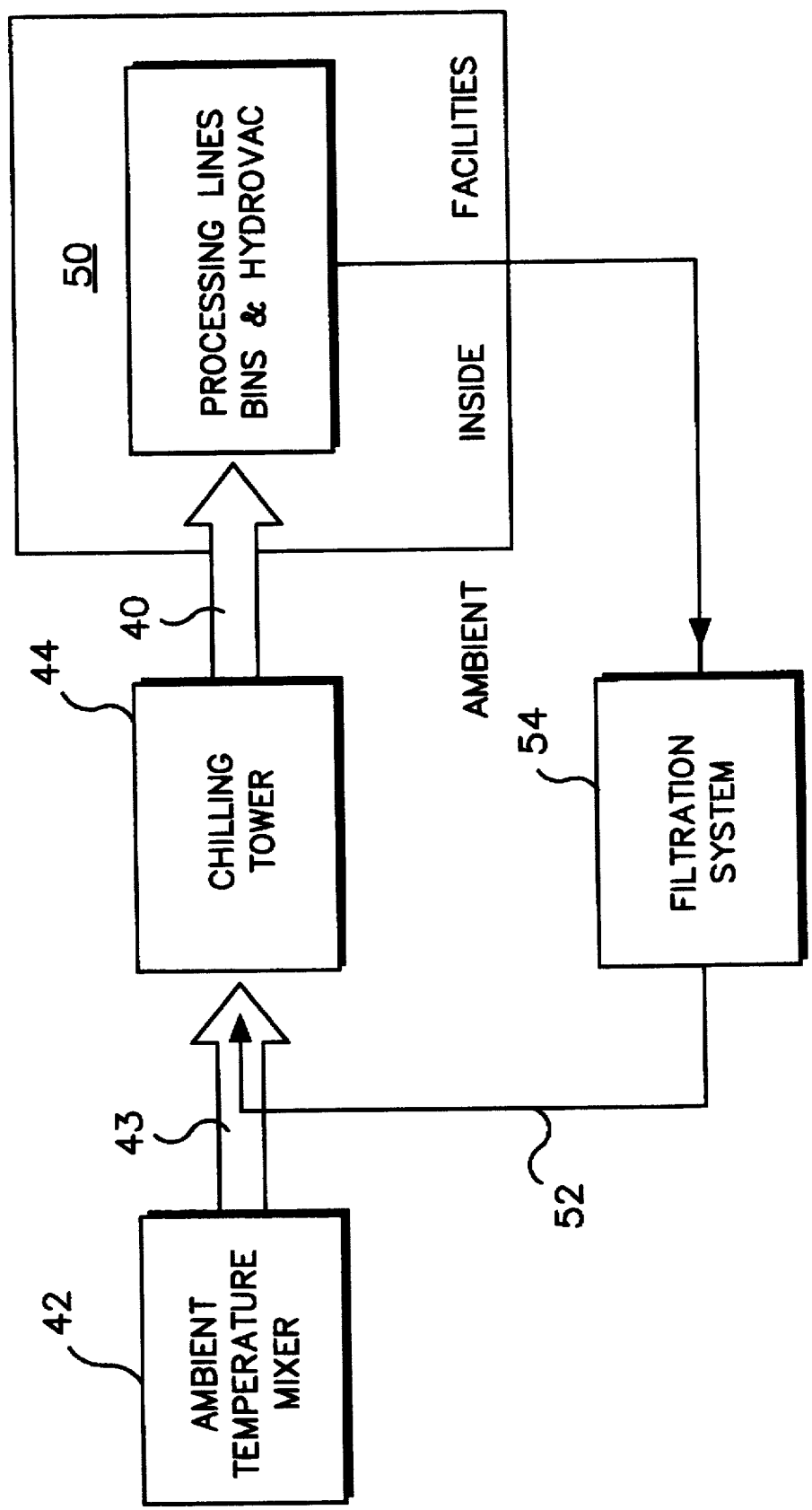
FIG. 4 is a block diagram of the water filtration and recycling system according to the present invention.

The tank hopper along the line immerses the field bin in water which includes chemicals from supply lines 40 at a cooled temperature of approximately 35 degrees F. Such chemicals as chlorine, sodium hydroxide, and citric acid may be included in the chilled water for prolonging shelf life of the produce. However, such chemicals tend to separate or not be soluable or not combine at the low temperature of the water. Therefore, the supply lines are sourced from an exterior mixing tank 42 (i.e., outside the cooled facility 50) which mixes water into a collection tank 42 at ambient temperature, above 35 degrees F. as illustrated in FIG. 4. The mixture of chemicals is pumped with recycled, filtered water 52 through a chilling tower 44 including a refrigerated chiller plate at a high rate of speed to lower the temperature of the mixture of water and chemicals, and this mixture is supplied 40 at the lowered temperature of about 35 degrees F. to the tank hopper. The water constantly circulates in the tank hopper and back into the filtration system 54 for an approximate 2-hour stability of the chemical mixture 43 for application to the produce that is being processed in order to prolong its shelf life.

The tank hopper gently tilts the produce onto in-feeding conveyor belts to operator tables in each production line. Such tables transport the produce to operators who cut, separate, select, and check for quality the produce being processed. A main operator at the head of the line chooses the end product to be produced from pictures displayed by the pick controller 33, as previously described. This information is converted into actions of the conveyors via a conventional programmable logic controller such as an Allen Bradley, Model OPTO 22SP which determines via preset routines the required line operations (e.g. the speed of the conveyor at about 12 feet/minute, the conveyor diverting the produce to the conical sizer 28 (explained later herein), the chemical and rinse cycles 30, 32 for about 11 seconds, and the like). This eliminates the requirement for highly skilled machinery operators, and facilities convenient reconfiguration of a line under computer control.

As illustrated in FIG. 2, the produce which has been identified for incorporation into the selected end product is cut, separated and selected, and may be transported to the "conical sizer" 41, or optionally to the bagging operation 47 shown in FIG. 5, or to a combining conveyor (which combines two or more types of produce in the correct mix to yield a product commonly referred to as a "medley pack").

Figure 3A:
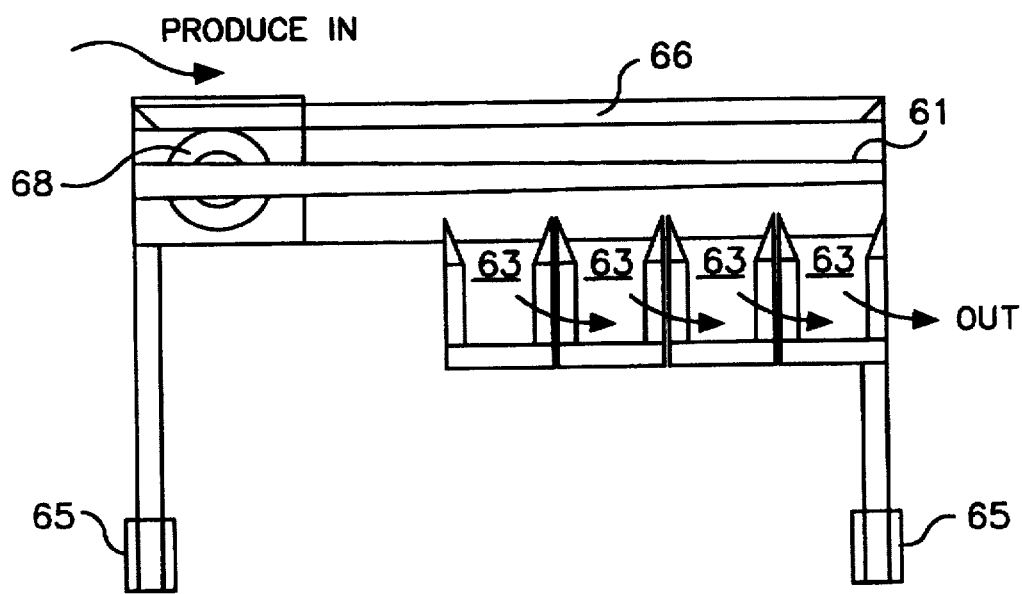
FIGS. 3A, B, and C are, respectively, side, top, and perspective views of a sizer mechanism according to the present invention.
Figure 3B:
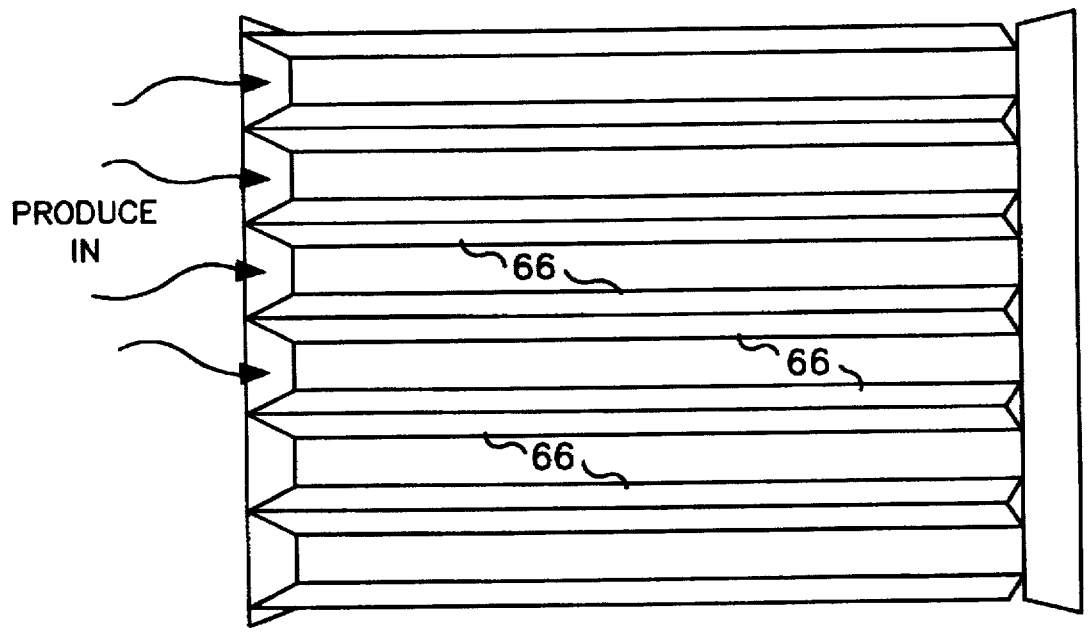
Figure 3C:
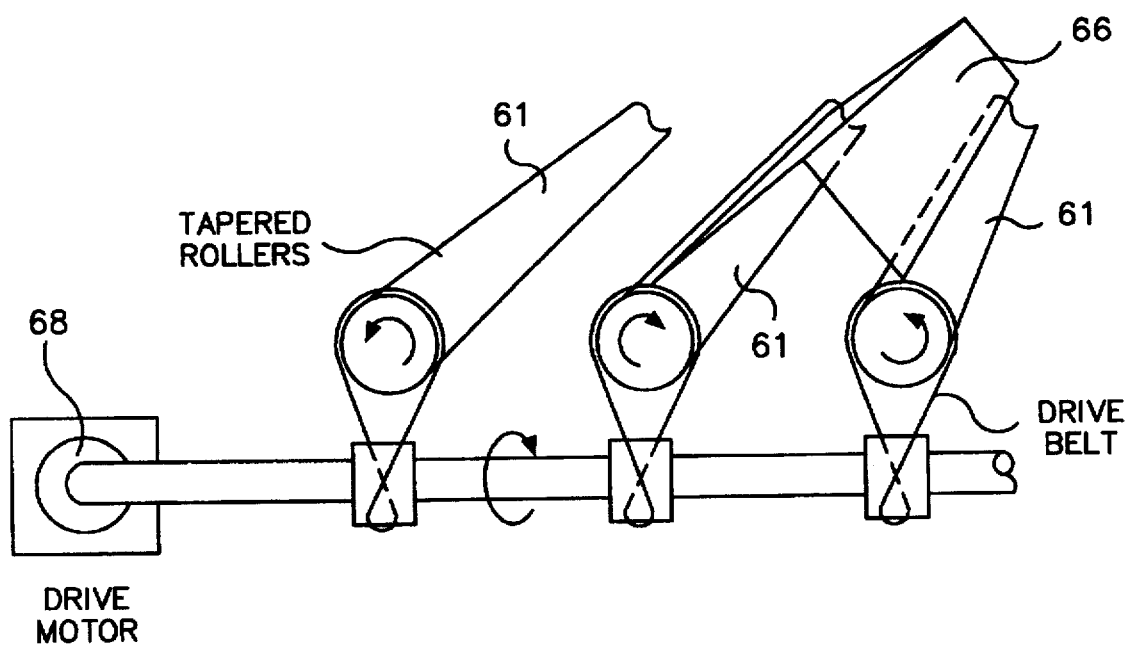

The conical sizing operation, as described with reference to FIGS. 3A, B, and C, receives produce transported from a cutting/separating/selecting table along declined conical tapered rollers 61 which are mounted to provide progressively widening gaps between rollers, as illustrated in the perspective view of FIG. 3C, to facilitate grading by size of produce that can drop through the gaps at successive locations along the lengths of the rollers. A plurality of troughs 63 are arranged laterally to the rollers to collect in segregated arrays the produce of different sizes that drop through the gaps between rollers 61 at different locations therealong into such troughs 63. Tapered walls 66 are arranged above the adjacent tapered rollers that have peripheral surfaces rotating downwardly to inhibit pinching the produce between such rollers, as shown in FIGS. 3A, B, and C.

Specifically, such conical sizing mechanism allows for gentle separation of flourette produce (i.e. broccoli, cauliflower, and the like) utilizing powered rollers 61 and gravity. The produce to be sized is fed to the series of conical or tapered rollers 61 which are rotated in opposing directions (i.e. with the roller surfaces moving upward adjacent the tapering gap) to alleviate the possibility of pinching produce. The pitch or declination of the rollers 61 is altered by hydraulic lifters 65, and the speed of rotation is adjustable (accomplishing a higher throughput function) by the programmable logic controller that alters the speed of the drive motor 68. Specifically, the ends of the roller array may be raised and lowered by hydraulic lifts 65 positioned at the remote supporting ends of the rollers 61. The tapered rollers 61 are formed of substantially bio-inert materials such as stainless steel or other USDA approved materials (e.g. Teflon, and the like), and are spaced apart from each other to provide a progressively-expanding gap therebetween through which produce of specific sizes falls into the cross troughs 63 positioned in lateral array below and along the length of the rollers. Each line may include another cooling rise 46, as shown in FIG. 5, to clean the produce once again and maintain it at the desired low temperature.

The produce from a production line may be transported via conveyor onto a collector that gathers the produce for even distribution to a scale system which gathers the produce, weighs it, and discharges it in unit volumes or weighted quantities to a conventional bagging machine. The bagging machine includes a stainless steel chute or tube that feeds into an extruded tube of thin plastic sheet material (chosen specifically for the produce which has been processed) which is sealed below the quantity of produce discharged into the tube. This packaging scheme allows for the seal below the produce to become the final seal above the previous quantity of produce discharged into the tube. Individual, sealed bags are cut within the seal regions, are bar coded, and are guided onto a transport conveyor. This conveyor transports the bags onto a turntable for collection of bar-coded bags, which are scanned for identification and then packaged in preformed cases. The cases accumulate on a conveyor which places them on shipping pallets in a palletizing area. Another bar code may be generated in conventional manner and applied to the pallet to contain shipping information and information about the produce on the pallet. This pallet bar code is scanned to signal the MRP system 26 that the product has left the production environment 37 described above and is ready for shipment. All of the processing and packaging operations described above occur in the production environment 37 that is maintained at a reduced temperature of about 35° F. and about 90% humidity.

The pallets from the packaging operations previously described are transported into the shipping storage system 29 which also arranges the pallets of cases of bagged produce in FIFO manner. The bar code on each pallet may be scanned to facilitate automatic indexing of selected pallets to forward storage positions as available. The pallets are then loaded from forward storage positions into refrigerated trucks 31 that ideally are also operated at reduced temperature of about 35° F. and about 90% humidity in the cargo bay, and that can be sealed during loading to the interior of the building (also operating at about 35° F. and about 90% humidity) which houses the production environment 37. The bar-code scanner information regarding each pallet of produce thus processed, stored, packaged and loaded into a truck is then transferred as data to the information management system 26 for archiving as information in support of the responsibility for the produce thus shipped now residing, for example, with the trucking firm. This entire process from initial chill rinse of the produce to truck-load shipment is performed at a temperature of not more than about 35 degrees F. and about 90% humidity in order to ensure a shelf life of the produce typically of about 30 days.

Therefore, the processing and apparatus of the present invention assures continued exposure of the produce being processed to an environment of reduced temperature which inhibits ripening of the produce and ensures longer shelf life after processing.

What is claimed is:

1. A method for improving the shelf life of harvested produce against decay and premature ripening, comprising the steps of:

reducing the temperature of the harvested produce to approximately 35 degrees Fahrenheit;

maintaining the produce substantially at the reduced temperature during processing subsequent to reducing the temperature of the produce;

temporarily storing, at substantially the reduced temperature and about 90% humidity, segregated volumes of selected types of the produce, for selection and subsequent processing;

selecting types of produce from storage for subsequent processing and packaging together for shipment at substantially the reduced temperature; and transferring the packaged produce at substantially the reduced temperature to a mobile environment at substantially the reduced temperature for shipment to a remote location.

2. The method according to claim 1 wherein the step of reducing the temperature of the produce includes immersing the produce in water cooled to approximately 35 degrees Fahrenheit.

3. The method according to claim 2 wherein the water includes produce-preservative chemicals for enhancing the shelf life of the produce against decay, and the method includes draining the water and vacuuming residual moisture from the produce.

4. The method according to claim 3 wherein the water is retrieved subsequent to immersing the produce and is filtered and is combined with said produce-preservative chemicals for cooling substantially to the reduced temperature for subsequent reuse in immersing and cooling produce.

5. The method according to claim 1 wherein the step of storing includes accumulating the segregated volumes of selected types of produce for selection and subsequent processing substantially on a first-in first-out basis.

6. The method according to claim 1 wherein after the step of selecting types of produce from storage, the produce from storage is segregated according to approximate size for subsequent combination with other produce from storage in selected arrangements.

7. The method according to claim 6 wherein the step of segregating according to size includes using a sizer having a plurality of axially-aligned and space tapered rollers for providing progressively increasing spacing along the lengths thereof, and wherein said step of the method of segregating the produce according to approximate size is performed by rotating pairs of adjacent ones of the plurality of rollers to provide upward orientation of peripheral movement of adjacent rollers, and by supplying produce to be sized thereby along the lengths of the rollers to drop between adjacent pairs of the plurality of rollers against the upward orientation of the peripheral movement thereof for collection at selected location along, and at associated spacings between, pairs of the adjacent ones of the plurality of rollers.

* * * * *